(12) United States Patent
Demmerle et al.

(10) Patent No.: US 9,327,601 B2
(45) Date of Patent: May 3, 2016

(54) HIGH-VOLTAGE INTERLOCK LOOP ("HVIL") SWITCH HAVING A REED RELAY

(75) Inventors: Markus Demmerle, Nieder Olm (DE); Harald Reuss, Gau-Odernheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 667 days.

(21) Appl. No.: 13/604,083

(22) Filed: Sep. 5, 2012

(65) Prior Publication Data

US 2014/0062180 A1  Mar. 6, 2014

(51) Int. Cl.
*B60L 3/00* (2006.01)
*H01H 51/28* (2006.01)
*H01H 1/20* (2006.01)

(52) U.S. Cl.
CPC ........ *B60L 3/00* (2013.01); *H01H 51/28* (2013.01); *Y02T 90/16* (2013.01)

(58) Field of Classification Search
USPC .......................................... 307/125, 9.1, 328
See application file for complete search history.

(56) References Cited

U.S. PATENT DOCUMENTS

| | | | | |
|---|---|---|---|---|
| 4,800,328 A | * | 1/1989 | Bolger | B60L 5/005 191/10 |
| 4,910,634 A | * | 3/1990 | Pipkorn | 361/147 |
| 2007/0115707 A1 | * | 5/2007 | Koide | 363/146 |
| 2011/0037317 A1 | | 2/2011 | Kuschnarew et al. | |

* cited by examiner

*Primary Examiner* — Robert Deberadinis
(74) *Attorney, Agent, or Firm* — Cantor Colburn LLP

(57) ABSTRACT

A high-voltage ("HV") system for a vehicle is provided, and includes a HV source providing HV power, a low-voltage source, a high-voltage interlock loop ("HVIL") switch, and at least one control module. The low-voltage source provides a low-voltage power that is less than the HV power. The HVIL switch is in communication with the low-voltage source. The HVIL switch includes a reed relay and a magnetic element. The magnetic element is selectively positioned within an actuation distance from the reed relay. The HVIL switch is in a closed circuit condition when the magnetic element is positioned within the actuation distance from the reed relay, and is in an open circuit condition when the magnetic element is positioned outside of the actuation distance from the reed relay. The at least one control module is in communication with and monitors the HVIL switch.

19 Claims, 2 Drawing Sheets

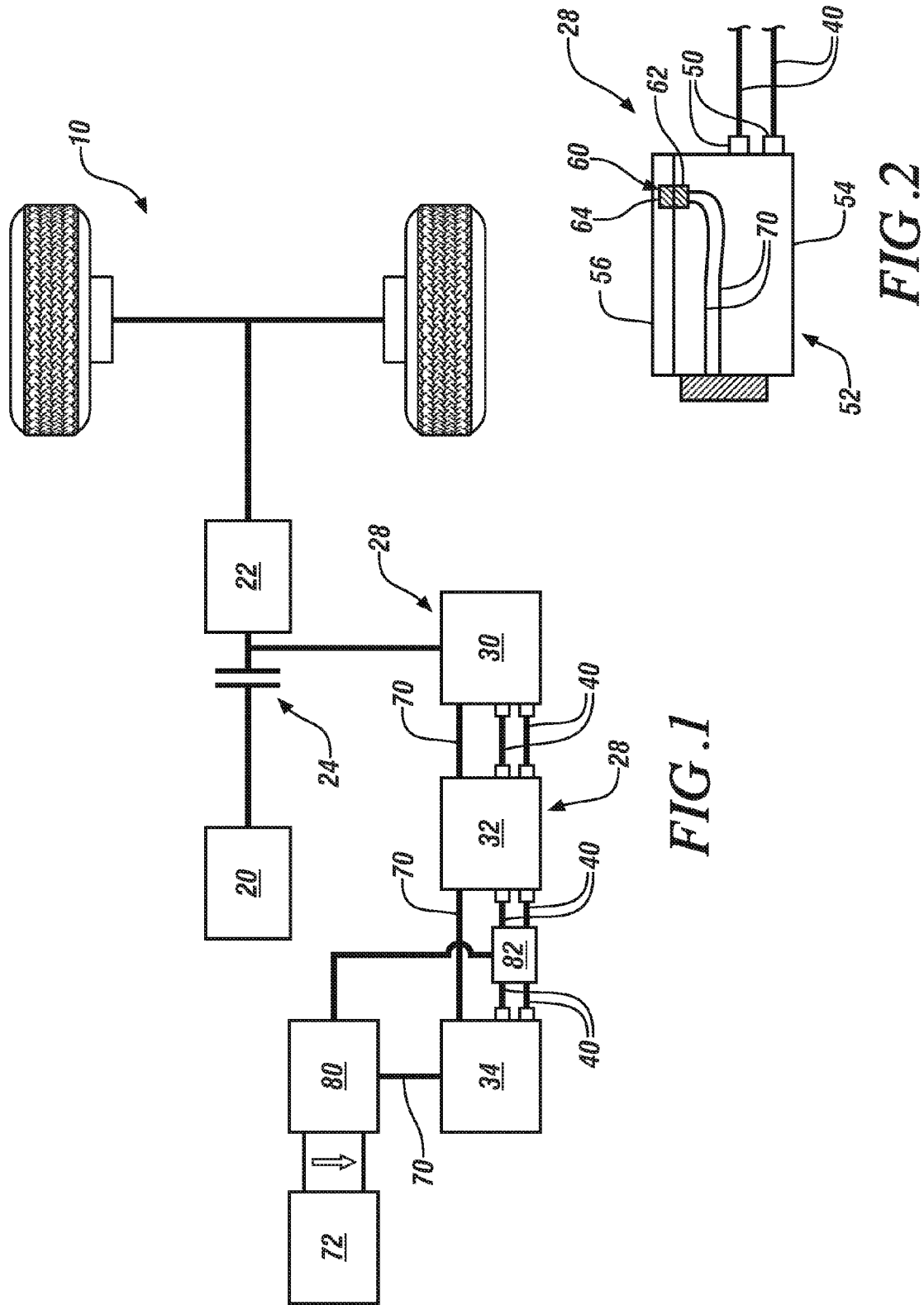

HIGH-VOLTAGE INTERLOCK LOOP ("HVIL") SWITCH HAVING A REED RELAY

FIELD OF THE INVENTION

Exemplary embodiments of the invention relate to a high-voltage ("HV") system for a vehicle and, more particularly, to a HV system including a high-voltage interlock loop ("HVIL") switch having a reed relay.

BACKGROUND

Hybrid vehicles, plug-in hybrid vehicles, and electric vehicles may be supplied with a high-voltage power supply such as, for example, a rechargeable battery pack. In order to protect against unintended access to a high-voltage ("HV") component (e.g., an AC motor, a power inverter, or the rechargeable battery pack), a high-voltage interlock loop ("HVIL") switch or circuit may be provided. An HVIL switch may be energized by relatively low-voltage power, and is provided to generally protect against unintentional access to the HV component. Specifically, if the HVIL switch experiences any change in electrical characteristics indicating potential access to the HV component (e.g., an open circuit condition), then the HV power supply is disconnected from the HV component.

The HVIL switch may include electromechanical contacts that are used to indicate potential access to the HV component (e.g., pins or mechanical microswitches) located within a housing. In order to gain access to the HV component during service, the housing will need to be opened. Opening the housing may make the electromechanical contacts susceptible to dirt, corrosion, or pollutants. Moreover, the electromechanical contacts may also be susceptible to tampering. Accordingly, it is desirable to provide an HVIL switch that has increased durability and reliability, and also has an increased resistance to tampering.

SUMMARY OF THE INVENTION

In one exemplary embodiment of the invention, a high-voltage ("HV") system for a vehicle is provided, and includes a HV source providing HV power, a low-voltage source, a high-voltage interlock loop ("HVIL") switch, and at least one control module. The low-voltage source provides a low-voltage power that is less than the HV power. The HVIL switch is in communication with the low-voltage source. The HVIL switch includes a reed relay and a magnetic element. The magnetic element is selectively positioned within an actuation distance from the reed relay. The HVIL switch is in a closed circuit condition when the magnetic element is positioned within the actuation distance from the reed relay, and is in an open circuit condition when the magnetic element is positioned outside of the actuation distance from the reed relay. The at least one control module is in communication with and monitors the HVIL switch. The control module sends a signal to deactivate supply of HV power if the open circuit condition is detected.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is an exemplary schematic illustration of a vehicle having at least one high-voltage ("HV") device;

FIG. 2 is an illustration of the HV device shown in FIG. 1;

DESCRIPTION OF THE EMBODIMENTS

Figure 3:
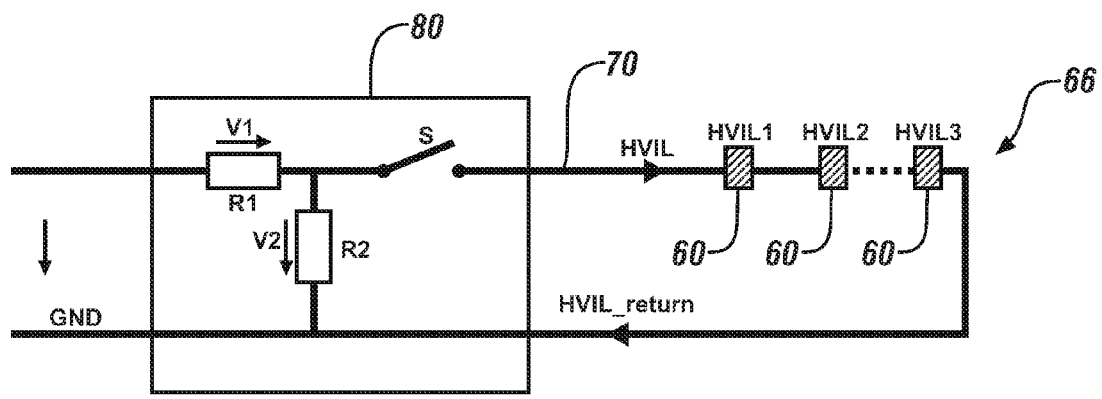
FIG. 3 is an illustration of a plurality of high-voltage interlock loop ("HVIL") switches.

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a vehicle 10 that is a high-voltage propelled vehicle such as, for example, a hybrid vehicle, a plug-in hybrid vehicle, or an electric vehicle. In one embodiment, the vehicle 10 may include an internal combustion engine 20 and a transmission 22 that is selectively connected to the engine 20 by a clutch 24. Specifically, the clutch 24 may be used to disconnect the engine 20 from the transmission 22 to allow vehicle propulsion by an alternative energy source, such as an AC motor 30. The vehicle 10 includes various high-voltage ("HV") devices 28 that are supplied with high-voltage ("HV") power. In the exemplary embodiment as shown in FIG. 1, the HV devices 28 include, but are not limited to, the AC motor 30 and a power inverter 32. A high-voltage ("HV") power supply 34 is used to provide HV power to the AC motor 30.

The HV power supply 34 may be, for example, one or more rechargeable batteries. For example, the rechargeable batteries may be nickel cadmium or lithium-ion batteries, however it is to be understood that any other type of electrical or electrochemical energy storage device may be used as well. In one embodiment, high-voltage is generally defined as any electric component or circuit having a working voltage ranging from about 60 Volts to about 1500 Volts DC. Alternatively, high-voltage may also be defined as any electric component or circuit with a maximum working voltage ranging between about 30 Volts and about 1000 Volts AC root mean square ("RMS"). Specifically, in one embodiment, high-voltage may be defined by the ISO 6469-3 standard.

HV power is supplied to the AC motor 30 from the HV power supply 34 through the power inverter 32. Specifically, HV lines or cables 40 containing HV conductors are used to connect the HV power supply 34 to the power inverter 32 and the AC motor 30. Turning now to FIG. 2, a schematic illustration of one of the HV devices 28 shown in FIG. 1 (e.g., either the AC motor 30 or the power inverter 32) is shown. In the exemplary embodiment as shown in FIG. 2, the HV cables 40 are connected to the HV device 28 using a pair of cable glands 50 (which are also referred to as a cable fitting). The HV device 28 is generally contained within a housing 52 having a main body 54 and a service lid or component cover 56. In the embodiment as shown, the HV cables 40 are fed through the main body 54 of the housing 52 and are connected to the HV device 28 through a busbar or a printed circuit board ("PCB") (not shown). It should be noted that while FIG. 2 illustrates cable glands 50, other approaches may be used as well to connect the HV cables 40 to the HV device 28. It should also be noted that while FIG. 2 illustrates the HV device 28, in one embodiment the housing 52 may also be used to contain the HV power supply 34. That is, with reference to both FIGS. 1-2, three different housings 52 may be provided for each of the AC motor 30, the power inverter 32, and the HV power supply 34.

A high-voltage interlock loop ("HVIL") switch 60 is part of the housing 52. The HVIL switch 60 generally creates a signal that is indicative of the HV devices 28 and the HV power supply 34 being accessed during service. Specifically, FIG. 2 illustrates the HVIL switch 60 located in both the main body 54 and the component cover 56 of the housing 52. The HVIL switch 60 includes a reed relay 62 and a magnetic element 64 (shown in greater detail in FIGS. 4-5). A HVIL power supply 72 (shown in FIG. 1) provides a relatively low-voltage power supply to the HVIL switch 60. In one exemplary approach, the HVIL power supply 72 may be an auxiliary power supply such as, for example, a 12 Volt lead-acid battery. In one embodiment, the low-voltage is generally defined as any voltage ranging from about −60 Volts to about 60 Volts DC, however, it is understood that other voltage ranges may be used as well. Moreover, in an alternative approach, an AC voltage may be used as well, where the low-voltage may be any voltage value up to about 30 V AC RMS.

Turning now to FIG. 3, an illustration of an HVIL circuit 66 that connects a plurality of HVIL switches 60 to one another is shown (e.g., where HVIL switch 1 corresponds to the HV power supply 34, HVIL switch 2 corresponds to the power inverter 32, and HVIL switch 3 corresponds to the AC motor 30 shown in FIG. 1). With reference to FIGS. 1-3, a low-voltage serial signal line 70 connects the HVIL switches 60 to one another, to the HVIL power supply 72 (FIG. 1), and to a control module 80.

The control module 80 is in communication with each of the HVIL switches 60 (shown in FIG. 3). The control module 80 is also in communication with a HVIL deactivation switch 82 (shown in FIG. 1). It should be noted that while a single control module 80 is illustrated, various control modules or submodules may be used as well. For example, in one approach, the control module 80 may be in communication with a main control module (not shown) as well.

The HVIL deactivation switch 82 acts as a lockout and is used to selectively deactivate HV power to the HV devices 28 to allow for servicing. The HVIL deactivation switch 82 is in communication with the control module 80 and the HV power supply 34. Specifically, in the embodiment as shown in FIG. 1, the HVIL deactivation switch 82 is used to connect the HV power supply 34 to the power inverter 32. In the event the control module 80 detects an open circuit condition through one of the HVIL switches 60, the control module 80 (or the main control module, which is not illustrated) sends a deactivation signal to the HV deactivation switch 82 to deactivate HV power to the power inverter 32 and the HV supply 34, and internal main contactors (not shown) of the HV deactivation switch 82 are opened. The HV cables 40 will be discharged to a relatively low voltage level, and voltage conversion performed by the power inverter 32 is disabled. Although FIG. 1 illustrates the HV deactivation switch 82 as a separate, stand-alone component, it is to be understood that the HV deactivation switch 82 may also be an integral part of the HV power supply 34 as well.

In the example as shown in FIG. 3, the control module 80 may include a first resistive element R1 and a second resistive element R2, as well as a switch S. The switch S is used to selectively connect the control module 80 to the low-voltage serial signal line 70 and the HVIL switches 60, and is used for diagnostic purposes. In the embodiment as shown the switch S is a single-pole single-throw switch, however, it is understood that the switch S may be any type of switch element such as, for example, a transistor. The first resistive element R1 and the second resistive element R2 are used to limit the current to the HVIL circuit 66, as well as to determine if a short circuit or an open circuit condition exists. Specifically, a first voltage V1 corresponding to the first resistive element R1 and a second voltage V2 corresponding to the second resistive element R2 are monitored, and indicate status of the low-voltage signal line 70 (e.g., the open circuit condition, a closed circuit condition, or the short circuit condition). It should be noted that while FIG. 3 illustrates the first resistive element R1, the second resistive element R2, and the switch S, other approaches may be used as well to determine the status of the low-voltage signal line 70.

Figure 4:
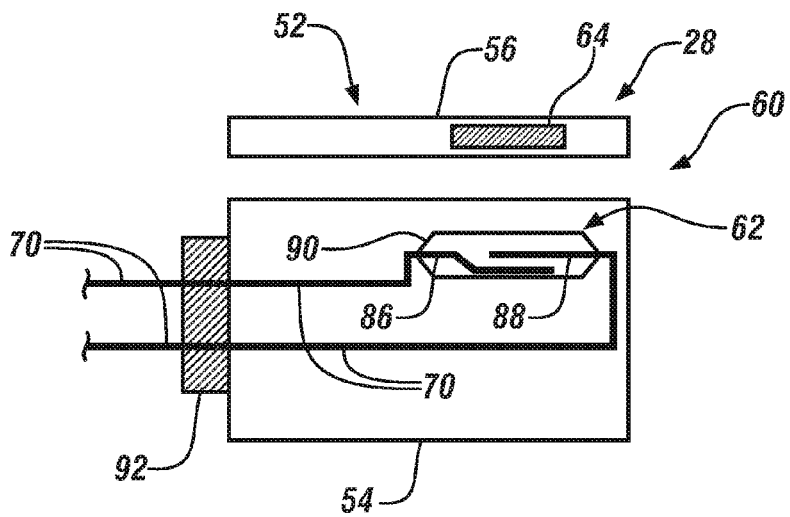
FIG. 4 is an illustration of the HV device shown in FIG. 2 in an open circuit condition.
Figure 5:
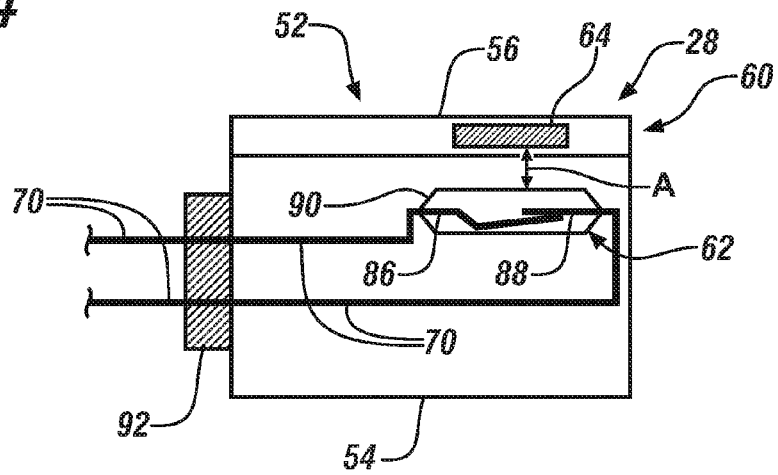
FIG. 5 is an illustration of the HV device shown in FIG. 2 in a closed circuit condition.

Turning now to FIGS. 4-5, the HVIL switch 60 includes the reed relay 62 and the magnetic element 64. The magnetic element 64 is selectively positioned within an actuation distance A (shown in FIG. 5) from the reed relay 62. The magnetic element 64 may be any element constructed from a magnetic material or having magnetic properties such as, for example, a permanent magnet or an electromagnet. The reed relay 62 may include a pair of elongated magnetic reeds 86 and 88 that are contained and generally hermetically sealed within an envelope 90. The magnetic reeds 86 and 88 are connected to the low-voltage serial signal line 70. The low-voltage serial signal line 70 is connected to the HVIL power supply 72 (shown in FIG. 1) though the control module 80 (shown in FIG. 3). Specifically, a low-voltage signal connector 92 is used to connect the HVIL switch 60 to the control module 80.

Referring to FIG. 4, if the magnetic element 64 is positioned outside of the actuation distance A, then the magnetic reeds 86 and 88 are generally separated from one another, and the HVIL switch 60 is in the open circuit condition. Turning now to FIG. 5, if the magnetic element 64 is positioned within the actuation distance A, a magnetic field is induced within the reed relay 62. The magnetic field causes the magnetic reeds 86 and 88 to be attracted one another such that the magnetic reeds 86 and 88 contact one another. If the magnetic reeds 86 and 88 contact one another, the closed circuit condition within the HVIL switch 60 is created. The control module 80 is connected to the low-voltage lead line 70 to monitor the HVIL switch 60, and determines if the open circuit condition or the short circuit condition exists (e.g., through the first resistive element R1, the second resistive element R2, and the switch S shown in FIG. 3).

The component cover 56 is selectively removable from the main body 54 of the housing 52. Thus, during service, an operator may remove the component cover 56 of the housing 52 to gain access to one of the HV devices 28 (e.g., the AC motor 30, the power inverter 32) or the HV power supply 34 as shown in FIG. 1. The magnetic element 64 is located within the component cover 56. Therefore, when the component cover 56 is affixed to the main body 54 of the housing 52 as shown in FIG. 5, the magnetic element 64 is positioned within the actuation distance A from the reed relay 62, thereby creating the closed circuit condition within the HVIL switch 60. However, if the component cover 56 is removed (e.g., during service) the magnetic element 64 is no longer positioned within the actuation distance A from the reed relay 62, thus creating the open circuit condition within the HVIL switch 60. In the event the control module 80 detects the open circuit condition within the HVIL switch 60, the control module 80 (or the main control module, which is not illustrated) sends the deactivation signal to the HVIL switch 82

(shown in FIG. 1) to deactivate HV power to the power inverter 32 and the HV power supply 34 (shown in FIG. 1).

The HVIL switch 60 as described above provides enhanced protection against contaminates when compared to some other types of HVIL switches that are currently available. This is because some types of HVIL switches generally use electromechanical contacts that are susceptible to dirt and corrosion. In contrast, reed relay 62 (shown in FIGS. 4-5) is generally hermetically sealed within the envelope 90. Thus, the magnetic reeds 86 and 88 remain generally impervious to contaminants. Moreover, because the magnetic reeds 86 and 88 are generally hermetically sealed, the magnetic reeds 86 and 88 may be less susceptible to tampering when compared to electromechanical contacts.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A high-voltage ("HV") system for a vehicle, comprising:
   a HV source providing HV power;
   a low-voltage source providing a low-voltage power on a low-voltage signal line,
   wherein the low-voltage power is less than the HV power;
   a high-voltage interlock loop ("HVIL") switch in communication with the low voltage source via the low-voltage signal line, comprising:
   a reed relay including a pair of elongated magnetic reeds and that is contained and generally hermetically sealed within an envelope; and
   a magnetic element that is selectively positioned within an actuation distance from the reed relay, wherein the HVIL switch is in a closed circuit condition if the magnetic element is positioned within the actuation distance from the reed relay and in an open circuit condition if the magnetic element is positioned outside of the actuation distance from the reed relay;
   at least one control module in communication with the HVIL switch, the at least one control module monitoring the HVIL switch and sending a signal on the low-voltage signal line to deactivate supply of HV power if the open circuit condition is detected,
   wherein the magnetic element is located within a removable cover affixed to a housing, wherein the housing includes the envelope,
   wherein the magnetic element is automatically positioned outside of the actuation distance from the reed relay to create the open circuit condition when the removable cover is removed from the housing, and
   wherein the at least one control module includes first and second resistive elements configured to determine a short circuit condition.

2. The HV system as recited in claim 1, comprising at least one HV device, wherein the HV source provides HV power to the at least one HV device.

3. The HV system as recited in claim 2, wherein the HVIL switch is located within a housing of the at least one HV device, and wherein the magnetic element is located within a cover of the housing and the reed relay is located within a main body of the housing.

4. The HV system as recited in claim 2, wherein the at least one HV device is at least one of a power inverter and an AC motor.

5. The HV system as recited in claim 1, wherein the magnetic element is one of a permanent magnet and an electromagnet.

6. The HV system as recited in claim 1, wherein the HV source includes one of a lithium ion battery and a nickel cadmium battery.

7. The HV system as recited in claim 1, wherein the HV power is a DC voltage ranging from about 60 Volts to about 1500 Volts.

8. The HV system as recited in claim 1, wherein the HV power is an AC voltage from about 30 Volts to about 1000 Volts root mean square ("RMS").

9. The HV system as recited in claim 1, wherein the low-voltage power ranges from about −60 Volts to about 60 Volts DC.

10. The HV system as recited in claim 1, wherein the low-voltage power is less than about 30 V AC RMS.

11. The HV system as recited in claim 1, wherein the magnetic element is automatically positioned within of the actuation distance from the reed relay to create the closed circuit condition when the removable cover is affixed to the housing.

12. A high-voltage ("HV") system for a vehicle, comprising:
    a HV source providing HV power;
    a low-voltage source providing a low-voltage power on a low-voltage signal line,
    wherein the low-voltage power is less than the HV power;
    a high-voltage interlock loop ("HVIL") switch in communication with the low voltage source via the low-voltage signal line, comprising:
    a reed relay including a pair of elongated magnetic reeds and that is contained and generally hermetically sealed within an envelope; and
    a magnetic element that is selectively positioned within an actuation distance from the reed relay, wherein the HVIL switch is in a closed circuit condition if the magnetic element is positioned within the actuation distance from the reed relay and in an open circuit condition if the magnetic element is positioned outside of the actuation distance from the reed relay;
    at least one control module in communication with the HVIL switch, the at least one control module monitoring the HVIL switch and sending a signal on the low-voltage signal line to deactivate supply of HV power if the open circuit condition is detected,
    wherein the magnetic element is located within a removable cover affixed to a housing, wherein the housing includes the envelope,
    wherein the magnetic element is automatically positioned outside of the actuation distance from the reed relay to create the open circuit condition when the removable cover is removed from the housing,
    wherein the at least one control module includes a first resistive element, a second resistive element, and a switch, and wherein the switch is used to selectively connect the control module to the HVIL switch.

13. A high-voltage ("HV") system for a vehicle, comprising:
    at least one HV device including a housing, the housing including a main body and a cover;
    a HV source providing HV power to the at least one HV device;

a low-voltage source providing a low-voltage power on a low-voltage signal line, wherein the low-voltage power is less than the HV power;

a high-voltage interlock loop ("HVIL") switch in communication with the low-voltage source via the low-voltage signal line, comprising:

a reed relay positioned within the main body of the housing, wherein the reed relay including a pair of elongated magnetic reeds and that is contained and generally hermetically sealed within an envelope; and a magnetic element positioned within the cover of the housing, wherein the magnetic element is selectively positioned within an actuation distance from the reed relay, wherein the HVIL switch is in a closed circuit condition if the magnetic element is positioned within the actuation distance from the reed relay and in an open circuit condition if the magnetic element is positioned outside of the actuation distance from the reed relay;

at least one control module in communication with the HVIL switch, the at least one control module monitoring the HVIL switch and sending a signal on the low-voltage signal line to deactivate supply of HV power to the at least one HV device if the open circuit condition is detected, wherein the magnetic element is located within a removable cover affixed to a housing, wherein the housing includes the envelope, wherein the magnetic element is automatically positioned outside of the actuation distance from the reed relay to create the open circuit condition when the cover is removed from the housing, and wherein the at least one control module includes first and second resistive elements configured to determine a short circuit condition.

14. The HV system as recited in claim 13, wherein the at least one HV device is at least one of a power inverter and an AC motor.

15. The HV system as recited in claim 13, wherein the at least one control module includes a first resistive element and a second resistive element that indicate the status of the low voltage line, and a switch, and wherein the switch is used to selectively connect the control module to the HVIL switch.

16. The HV system as recited in claim 13, wherein the magnetic element is one of a permanent magnet and an electromagnet.

17. The HV system as recited in claim 13, wherein the HV source includes one of a lithium ion battery and a nickel cadmium battery.

18. The HV system as recited in claim 13, wherein the HV power is a DC voltage ranging from about 60 Volts to about 1500 Volts.

19. The HV system as recited in claim 13, wherein the HV power is an AC voltage from about 30 Volts to about 1000 Volts root mean square ("RMS").

* * * * *